(12) United States Patent
Schumann et al.

(10) Patent No.: US 10,559,857 B2
(45) Date of Patent: Feb. 11, 2020

(54) SEPARATOR COMPRISING FORCE-LOCKED PARTICLES

(71) Applicant: Robert Bosch GmbH, Stuttgart (DE)

(72) Inventors: Bernd Schumann, Rutesheim (DE); Ulrich Eisele, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 15/324,820

(22) PCT Filed: Jun. 9, 2015

(86) PCT No.: PCT/EP2015/062852
§ 371 (c)(1),
(2) Date: Jan. 9, 2017

(87) PCT Pub. No.: WO2016/008648
PCT Pub. Date: Jan. 21, 2016

(65) Prior Publication Data
US 2017/0222279 A1 Aug. 3, 2017

(30) Foreign Application Priority Data
Jul. 15, 2014 (DE) .................. 10 2014 213 679

(51) Int. Cl.
*H01M 10/42* (2006.01)
*H01M 10/0525* (2010.01)
(Continued)

(52) U.S. Cl.
CPC ....... *H01M 10/4235* (2013.01); *H01M 2/145* (2013.01); *H01M 2/166* (2013.01);
(Continued)

(58) Field of Classification Search
CPC ........... H01M 10/052; H01M 10/0525; H01M 10/4235; H01M 12/04; H01M 12/08;
(Continued)

(56) References Cited

U.S. PATENT DOCUMENTS

| 9,065,121 B2 | 6/2015 | Kajita et al. | |
| 2009/0229700 A1* | 9/2009 | Kanamura | H01M 10/052 141/1.1 |
| 2011/0223486 A1* | 9/2011 | Zhang | B01D 67/0027 429/247 |

FOREIGN PATENT DOCUMENTS

| CN | 1717821 A | 1/2006 |
| CN | 103917370 A | 7/2014 |

(Continued)

OTHER PUBLICATIONS

Fanous et al., "Structure-Related Electrochemistry of Sulfur-Poly(acrylonitrile) Composite Cathode Materials for Rechargeable Lithium Batteries" Chemistry of Materials, 2011, 23, 5024-5028.
(Continued)

*Primary Examiner* — Lingwen R Zeng
(74) *Attorney, Agent, or Firm* — Norton Rose Fulbright US LLP; Gerard Messina

(57) ABSTRACT

A separator for an electrochemical cell, in particular a lithium cell, and a corresponding manufacturing method. In order to provide a separator having an elevated dendrite resistance, in particular ion-conducting, particles are introduced into pores of a polymer layer and frictionally retained between polymer walls delimiting pores. An electrochemical cell equipped therewith is also described.

19 Claims, 2 Drawing Sheets

(51) Int. Cl.
   *H01M 2/16* (2006.01)
   *H01M 2/14* (2006.01)
   *H01M 10/052* (2010.01)
   *H01M 12/04* (2006.01)
   *H01M 12/08* (2006.01)

(52) U.S. Cl.
   CPC ....... *H01M 2/1646* (2013.01); *H01M 2/1653* (2013.01); *H01M 2/1686* (2013.01); *H01M 10/052* (2013.01); *H01M 10/0525* (2013.01); *H01M 12/04* (2013.01); *H01M 12/08* (2013.01); *H01M 2300/0082* (2013.01); *H01M 2300/0088* (2013.01); *H01M 2300/0091* (2013.01); *H01M 2300/0094* (2013.01); *Y02E 60/128* (2013.01)

(58) Field of Classification Search
   CPC . H01M 2300/0082; H01M 2300/0088; H01M 2300/0091; H01M 2300/0094; H01M 2/145; H01M 2/1646; H01M 2/1653; H01M 2/166; H01M 2/1686; Y02E 60/128
   See application file for complete search history.

(56) References Cited

FOREIGN PATENT DOCUMENTS

| | | |
|---|---|---|
| DE | 10255121 A1 | 6/2004 |
| EP | 2308917 A1 | 4/2011 |
| JP | 2006507636 A | 3/2006 |
| WO | 2004021477 A1 | 3/2004 |
| WO | 2014093519 A1 | 6/2014 |

OTHER PUBLICATIONS

Fanous et al., "Correlation of the electrochemistry of poly(acrylonitrile)-sulfur composite cathodes with their moledcular structure" Journal of Materials Chemistry, 2012, 22, 23240-23245.

International Search Report, dated Aug. 25, 2015, of the corresponding International Application PCT/EP2015/062852 filed Jun. 9, 2015.

* cited by examiner

SEPARATOR COMPRISING FORCE-LOCKED PARTICLES

FIELD

The present invention relates to a separator for an electrochemical cell and to a manufacturing method therefor, and to an electrochemical cell equipped therewith.

BACKGROUND INFORMATION

Electrochemical cells, such as lithium cells, usually have an anode, a cathode, and a separator disposed therebetween. The separator serves to prevent mechanical contact between the anode and cathode.

In lithium ion cells the separator is usually configured in the form of a porous polymeric layer through which liquid electrolyte can penetrate and thereby transfer lithium ions.

In order to achieve a higher cell voltage, metallic lithium ($Li^{-0}$) can also be used on an anode side in lithium cells. When an anode made of metallic lithium is used, however, dendrites of metallic lithium can form upon charging; these can damage the separator of the cell or in some cases even penetrate through it and destroy the cell.

In practice, graphite is usually used as an anode material in order to avoid the formation of dendrites. Graphite is a lithium intercalation material into which lithium metal atoms can be deposited. As compared with pure metallic lithium, however, graphite has a cell voltage that is 0.3 V lower (referred to anode masse), and an energy density that is lower by several factors.

German Patent No. DE 102 55 121 A1 relates to a separator having an asymmetrical pore structure for an electrochemical cell.

PCT Application No. WO 2004/021477 A1 relates to an ion-conducting battery separator for lithium batteries and to a method for the manufacture thereof, and to the use thereof.

SUMMARY

In accordance with the present invention, a separator for an electrochemical cell, in particular a lithium cell, is provided that encompasses a porous polymer layer and, in particular ion-conducting, particles.

The polymer layer can in particular have continuous pores or continuous pore networks. The pores of the polymer layer can in particular be delimited by polymer walls. The particles can in particular be introduced into pores of the polymer layer and be frictionally retained between the polymer walls that in particular delimit the pores.

A separator of this kind can in particular be manufactured using a method that encompasses the method steps of:

a) elongating, in particular stretching, a porous polymer layer, in particular having continuous pores and/or continuous pore networks;

b) introducing, in particular ion-conducting, particles into pores on at least one side of the polymer layer in the elongated state; and c) relaxing or de-tensioning the polymer layer.

In accordance with the present invention, a corresponding method for manufacturing a separator, in particular a separator according to the present invention, for an electrochemical cell, for instance a lithium cell, is also provided.

A "pore network," which can also be referred to, for instance, as a "pore structure" or "pore system," can be understood in particular as a, for instance channel-like, cavity structure made up of several pores opening into one another.

The pores or pore networks can be, in particular, continuous to both sides of the polymer layer. "Both sides" of the polymer layer can be understood in this context in particular as the two sides, in particular located opposite one another, of the polymer layer having the largest planar area (principal surfaces).

The polymer layer can have, for instance, a pore proportion, in particular of continuous pores or pore networks, of approximately ≥30 vol % to ≤90 vol %, for example from ≥50 vol % to ≤80 vol %. The pores or pore networks can be constituted using different methods, for instance ones explained later.

A "polymer layer" can be understood in particular as a layer that encompasses at least one polymer. For instance, a polymer layer can encompass one polymer or two or several polymers, for instance a polymer mixture. The layer can be single-ply or also two-ply or multi-ply. For instance, the polymer layer can also be a layer that encompasses two or more different, in particular porous, plies, for example made of different polymers. The plies can be, for example, laminated together into one layer.

What can advantageously be achieved thanks to the elongation, in particular stretching, in method step a) is that the average pore size of the pores of the polymer layer increases and, for instance, the pores open up for the introduction of particles in method step b). In method step b) the particles can then be introduced into the pores and, for instance, can at least partly, for instance largely, if applicable completely, fill them. What can then advantageously be achieved thanks to the relaxation or de-tensioning of the polymer layer in method step c) is that the average pore size of the pores of the polymer layer shrinks again, the result of the relaxing polymer layer in particular being that a force (retaining force), for instance a compressive stress or an elongation recovery force or a relaxation force of the polymer layer, is applied onto the introduced or incorporated particles, thanks to which in particular the particles are frictionally retained, for instance by adhesive friction, between polymer walls of the polymer layer which delimit pores and can thereby, if applicable without further means, be fastened or secured in the polymer layer. Also as a result of the relaxation or de-tensioning of the polymer layer in method step c), the particles advantageously can be positively enclosed by a, for instance elastic, deformation of the polymer walls and can thereby be additionally fastened or secured in the polymer layer, if applicable without further means.

Impervious embedding of the particles in the polymer layer, and sealing of the pores, can be achieved by way of the particles that are introduced into the pores and frictionally retained, the result thereof in turn being that growth of dendrites into the pores, in particular filled with the particles, can be impeded or prevented. Growth of dendrites through the polymer layer can thus in turn advantageously be prevented.

All in all, a separator having an elevated dendrite resistance, for example to lithium dendrites, can thereby advantageously be made available.

Ion conduction through the separator can advantageously be ensured or improved by the fact that the particles are ion-conducting.

The polymer layer can furthermore be strengthened by the particles, while advantageously retaining its flexibility. A strengthened and nevertheless flexible separator, in particular hybrid separator, can thereby advantageously be made available, said separator combining the flexibility of a polymer separator with the hardness of a solid electrolyte separator and being capable, for instance because of its, in particular macroscopic, flexibility, of being further processed like a polymer separator.

The porous polymer layer can be, for instance, a pore-exhibiting polymeric support, for example in the form of a membrane. A porous polymer layer can be manufactured, for instance, using a process of stretching and/or expanding a, for instance cellularly constructed, polymer having at least two differently extensible phases. Alternatively or in addition thereto, the porous polymer layer can be manufactured from a block copolymer in which at least one phase of the polymer is partly or, if applicable, completely removed using a solvent or solvent mixture so that empty spaces or pores are thereby produced, for instance in the other phase of the polymer, in particular offering room for the particles. A porous polymer separator manufactured according to other methods or available commercially can, however, also be used, for instance, as a porous polymer layer. The porous polymer layer can be, in particular, elastic. The elongation in method step a) can therefore be referred to as an elastically proceeding elongation.

The polymer layer can also encompass a polymer, or several polymers, which can be referred to as harder polymers or mechanically strong polymers. For example, the polymer layer can be a polystyrene or a polyimide or a polyphenylene sulfide or a polyterephthalate or a polycarbonate or a polyacrylate or a polyurethane or another mechanically strong polymer or a mixture thereof, or a two-ply or multi-ply layer, for instance having different plies, for example made of different polymers or polymer mixtures. Thanks to the use of harder or mechanically strong polymers, it is advantageously possible to achieve improved dendrite resistance in the separator, for instance with respect to lithium dendrites.

The, in particular ion-conducting, particles can be, for instance, cation-conducting, for example lithium ion-conducting or sodium ion-conducting, or proton-conducting, in particular metal ion-conducting, for example lithium ion-conducting or sodium ion-conducting, or anion-conducting, for example chlorine ion-conducting or fluorine ion-conducting or oxygen ion-conducting.

The ion-conducting particles can be constituted in particular from a material that is ion-conducting for the ion to be conducted in the electrochemical cell to be equipped with the separator.

For example, the separator can be designed for a lithium cell, for instance lithium ion cell, lithium-sulfur cell, or lithium-oxygen cell (or lithium-air cell).

The ion-conducting particles can be or become selected, for instance, from a plurality of ceramic ion conductors, in particular for metal ions, for instance for lithium ions. For example, the ion-conducting particles can be constituted from ion-conducting crystalline materials or ion-conducting glasses, which encompass, for example, compounds of lithium, sulfur, and/or phosphorus, for instance having at least one doping element such as silicon and/or germanium and/or another semiconductor, and/or a halogen, for example chlorine, iodine, bromine, and/or fluorine. For example, the particles can encompass a lithium-containing argyrodite or be constituted therefrom.

A "lithium cell" can be understood in particular as an electrochemical cell, for instance a rechargeable battery cell or primary battery cell, in the electrochemical reaction of which lithium participates.

A "lithium-ion cell" can be understood in particular as a cell in whose cathode material lithium ions can be, in particular reversibly, for instance chemically, incorporated, for instance intercalated.

For example, the cathode material can encompass at least one lithium-metal oxide, for instance lithium-nickel oxide and/or lithium-cobalt oxide and/or lithium-manganese oxide, for example lithium-nickel and/or lithium-cobalt oxide, for instance doped with aluminum (NCA), and/or lithium-nickel-cobalt-manganese oxide (NCM), for example having ⅓ nickel, ⅓ cobalt, and ⅓ manganese, and/or high-energy metal oxide, in particular $Li_2MnO_3$. The cell can also be referred to as a "lithium-metal oxide cell." The anode can encompass metallic lithium or a lithium alloy (lithium metal anode) or also an intercalation material, for example graphite.

A "lithium-sulfur cell" can be understood in particular as a cell whose cathode material encompasses sulfur. The cathode material can encompass, for instance, a chemical compound of sulfur with a polymer, for instance polyacrylonitrile, which for example is manufactured using a thermal process, for instance by dehydration and sulfidation, and/or a sulfur composite, in particular made up of sulfur and a conductive agent such as carbon, for instance in which the sulfur is enclosed, and/or elemental sulfur. For instance, the cathode material can encompass SPAN. "SPAN" can be understood in particular as a polymer, based on polyacrylonitrile (PAN), having covalently bonded sulfur, which is obtainable in particular by a thermal conversion and/or chemical reaction of polyacrylonitrile in the presence of sulfur. In particular, nitrile groups can react in this context to yield a polymer in which the nitrile groups are converted into mutually attached nitrogen-containing rings, in particular six-membered rings, having covalently bound sulfur. SPAN is described in Chem. Mater., 2011, 23, 5024 and J. Mater. Chem., 2012, 22, 23240, and in PCT Application No. WO 2013/182360 A1.

For a lithium cell, for instance a lithium-ion cell, lithium-sulfur cell, or lithium-oxygen cell (or lithium-air cell), the ion-conducting particles can in particular be constituted in lithium-conducting fashion or from a lithium ion-conducting material.

The separator can also, however, be designed for a sodium cell.

A "sodium cell" can be understood in particular as an electrochemical cell, for instance a rechargeable battery cell or primary battery cell, in the electrochemical reaction of which sodium participates. Sodium cells can be constituted analogously to the lithium cells described above. For instance, a sodium cell can have a sodium anode.

For a sodium cell, the ion-conducting particles can in particular be constituted in sodium ion-conducting fashion or from a sodium ion-conducting material.

The separator can also, however, be designed for a hydrogen cell.

A "hydrogen cell" can be understood in particular as an electrochemical cell, for instance a fuel cell and/or electrolysis cell, in the electrochemical reaction of which hydrogen participates.

For a hydrogen cell, the ion-conducting particles can in particular be constituted in proton-conducting fashion or from a proton-conducting material.

The separator can also, however, be designed for an anion cell.

An "anion cell" can be understood in particular as an electrochemical cell, for instance a rechargeable battery cell or primary battery cell, in the electrochemical reaction of which anions, for instance chlorine ions, fluorine ions, and/or oxygen ions, participate.

For an anion cell, the ion-conducting particles can in particular be constituted in chlorine ion-conducting, fluorine ion-conducting, or oxygen ion-conducting fashion or from a chlorine ion-conducting, fluorine ion-conducting, or oxygen ion-conducting material.

The separator can also, however, be designed for a redox flow cell.

A "redox flow cell" can be understood in particular as an electrochemical cell, for instance a rechargeable battery cell or primary battery cell, in which the electrode materials are furnished in a liquid suspension and/or solution.

The particles can be configured from an impervious material or from a porous material.

For instance, the particles can be porous, for example readily porous. Porous particles can advantageously constitute at least one, if applicable ion-conducting, mechanical insulation layer that can prevent contact between an anode and cathode in the further surroundings of the separator in the event of a defect in the cell, for example due to a local short circuit, for instance by the fact that they can counteract thermal shrinkage of the separator, for example as a result of a melting process. Porous particles can furthermore enable conductivity through a liquid electrolyte and, in particular, advantageously permit a liquid electrolyte to participate in the conductivity.

In a context of a special embodiment, however, the particles are constituted from an impervious, in particular liquid electrolyte-impervious or liquid-impervious and/or, if applicable, gas-impervious, material. Impervious or non-porous particles can advantageously mutually shield the anode space and cathode space or separate them from one another, in particular hermetically. Passage of liquid, for instance of liquid electrolyte and/or another liquid phase, for instance of polysulfides as in a lithium-sulfur cell, or of other reaction products, such as dissolved manganese from manganese-containing metal oxide cathodes, or moisture, through the separator can thereby advantageously be at least largely prevented. The result is that degradation mechanisms accompanying the penetration of liquids through the separator, for instance those mechanisms which derive from the carryover of materials from cathode to anode (or vice versa), can in turn advantageously be avoided. In lithium-ion cells, for example, degradation due to carryover of anode-poisoning manganese ions from the cathode into the anode can be avoided. On the other hand, because the impervious particles are ion-conducting in particular for the ion necessary in the cell, for instance are lithium ion-conducting, the particles can enable the ion transfer, for instance of lithium ions, necessary for the functioning of the cell, which transfer occurs in conventional porous polymer separators through the open pores of the separator. In particular, the particles can therefore be constituted from an impervious material, in particular from an impervious, ion-conducting material.

In lithium-sulfur cells, thanks in particular to impervious, ion-conducting particles the transport of polysulfides, formed upon discharge of the cathode, to the anode, in particular to a lithium metal anode, can advantageously be prevented; this is referred to as a "shuttle mechanism."

In lithium-oxygen cells (or lithium-air cells), thanks in particular to impervious, ion-conducting particles it is advantageously possible to prevent isolation of the anode from the cathode impinged upon by moisture and carbon dioxide ($CO_2$), and thereby to enable operation of the anode in an anaerobic, for instance ultra-dry, electrolyte phase thereby achieved, and thereby extend the service life of the anode.

The ion-conducting particles can be constituted, for instance, from a solid ion conductor or solid electrolyte. The ion-conducting particles can be, for instance, inorganic or organic.

In the context of an embodiment, the particles are inorganic or organic particles. The particles can in particular be inorganic particles. Inorganic particles can advantageously be hard with respect to dendrites, such as lithium dendrites, and for instance can be penetrated very little or not at all by dendrites. A mechanical separation between anode and cathode is thereby advantageously achieved by way of the inorganic particles, and the reliability of the cell to be equipped with the separator can thereby be enhanced.

Cation-conducting, for instance metal ion-conducting, for example lithium ion-conducting and/or sodium ion-conducting, and/or proton-conducting, and/or anion-conducting, for example chlorine ion-conducting, fluorine ion-conducting, and/or oxygen ion-conducting, inorganic solids and/or (organic) polymers can be used, for instance, for ion conduction.

In the context of a further embodiment the particles are cation-conducting, for instance metal ion-conducting, for example lithium ion-conducting and/or sodium ion-conducting, and/or proton-conducting, and/or anion-conducting, for example chlorine ion-conducting, fluorine ion-conducting, and/or oxygen ion-conducting.

For instance, the particles or the solid ion conductor or solid electrolyte can be ceramic. Ceramic particles can advantageously be particularly hard with respect to dendrites, such as lithium dendrites, and for instance can be penetrated very little or not at all by dendrites. A mechanical separation between anode and cathode can thereby advantageously be achieved by way of the ceramic, in particular ion-conducting, particles, and the reliability of the cell to be equipped with the separator can thereby be enhanced.

For example, the particles can encompass an, in particular lithium ion-conducting, lithium garnet or can be constituted therefrom.

Alternatively or in addition thereto, the particles can encompass an, in particular lithium ion-conducting, lithium argyrodite or can be constituted therefrom.

Solid ion conductors or solid electrolytes, for example lithium garnet and/or lithium argyrodite, can advantageously exhibit a lithium ion conductivity that is in particular comparable to the lithium ion conductivity of liquid lithium electrolytes, for example of up to approximately $10^{-3}$ S/cm.

In the context of a special embodiment, the particles are lithium ion-conducting. The particles can be constituted, for instance, from a lithium ion-conducting solid electrolyte. Separators manufactured in this fashion can be used in particular for lithium cells, such as lithium-ion cells, for instance having a lithium metal anode or intercalation anode, and/or lithium-sulfur cells and/or lithium-oxygen cells.

It is likewise possible, however, to use other solid ion conductors for other electrochemical cells, for instance primary batteries and/or electrochemical storage cells, for example redox flow cells. For sodium ion conduction, for example, a ceramic structure from the class of the sodium beta-aluminum oxides can be used. For proton conduction, for instance, a Nafion polymer and/or fluorosulfonated polymer can be used.

In method step b) the, in particular ion-conducting, particles can be introduced into the pores, for instance, by the fact that a powder is applied onto at least one side of the polymer layer in the elongated state. The fact that the particles are applied in method step b) onto at least one side of the polymer layer in the elongated state allows the particles to penetrate into the pores of the polymer layer or to be introduced or filled thereinto, in particular because of the average pore size that is enlarged because of the elongation. Particles used in the form of a powder can also be referred to as "powder particles." Introduction or application of the particles in method step b) can be accomplished both after and during manufacture of the pore structure of the polymer layer. For instance, if the porosity of the polymer layer is generated by a stretching and/or expansion process, method step a) and/or b) can already be carried out, for instance, in the course of manufacture of the porous polymer layer. Process steps can thereby advantageously be minimized.

The particles can have in particular an average particle size ($d_{Pa}$), which ($d_{Pa}$) is less than or equal to the average pore size ($d_{Po2}$) of the elongated polymer layer. In principle, the particles can have an average particle size ($d_{Pa}$) that is greater than, equal to, or less than the average particle size ($d_{Po1}$) of the unelongated polymer layer.

In the context of an embodiment, the particles have an average particle size ($d_{Pa}$), which ($d_{Pa}$) is less than, in particular appreciably less than, for instance ≤50% less than, for example ≤15% less than, the average pore size ($d_{Po1}$) of the polymer layer in the or in an unelongated state. The advantageous result that can be achieved thereby is that in the elongated state of the polymer layer, as many particles as possible can penetrate into the pores of the polymer layer and can fill them up, in particular largely, if applicable completely, and the relaxation of the polymer layer compresses the particles and allows a compact and, for instance, substantially complete filling of the pores to be achieved. Improved dendrite resistance in the separator, for instance with respect to lithium dendrites, can thereby advantageously be achieved.

In the context of a preferred embodiment, the particles have an average particle size ($d_{Pa}$), which ($d_{Pa}$) is greater than the average pore size ($d_{Po1}$) of the polymer layer in the or in an unelongated state. The advantageous result that can be achieved thereby is that after elongation and relaxation of the polymer layer, the particles are each, for instance over their entire periphery, fixedly enclosed by the polymer material of the polymer layer. Because particles as such can have a greater mechanical strength or hardness and/or imperviousness than a compressed assemblage made up of a plurality of particles, a particularly good sealing effect can thereby advantageously be achieved and the dendrite resistance of the separator, for instance with regard to lithium dendrites, can be further increased, and degradation mechanisms associated with the penetration of liquids through the separator can be even better avoided.

In the context of a special realization of this embodiment, the particles therefore have an average particle size ($d_{Pa}$), which ($d_{Pa}$) is greater than the average pore size ($d_{Po1}$) of the polymer layer in the or in an unelongated state and less than or equal to the average pore size ($d_{Po2}$) of the polymer layer in the or in an elongated state.

The average spacing ($d_w$) between the pores in the unelongated or relaxed state of the polymer layer can in particular be smaller than the average particle size ($d_{Pa}$) of the particles. The average wall thickness ($d_w$) of the polymer walls, which in particular delimit the pores of the polymer layer, in the unelongated or relaxed state of the polymer layer, can accordingly be less than the average particle size ($d_{Pa}$) of the particles.

In the context of a further embodiment the average wall thickness ($d_w$) of the polymer walls, which in particular delimit the pores of the polymer layer, is, in particular in the or in an unelongated state of the polymer layer, on average less than the average particle size ($d_{Pa}$) of the particles.

In particular, the polymer walls between the pores of the polymer layer can have an average wall thickness that is less than the average diameter of dendrites, for instance lithium dendrites.

For example, the porous polymer layer can exhibit an average spacing between the pores, or an average wall thickness ($d_w$) of the polymer walls, which is less than or equal to a quarter of the average pore size. What can advantageously be achieved thereby is that dendrites that may occur in the context of utilization of the cell, for instance lithium dendrites, cannot penetrate between the particles through the polymer walls, since ingrowing dendrites encounter introduced particles and are thus prevented from exerting a, for instance comminuting and/or penetrating, force on the polymer walls. The dendrite resistance of the separator, for instance with respect to lithium dendrites, can thereby advantageously be further increased.

In the context of a further embodiment, in method step a) the polymer layer is elongated in a longitudinal direction and/or in a transverse direction, in particular in a longitudinal direction and in a transverse direction. In that context, for instance, the polymer layer can be elongated, in particular stretched, ≥20% in a longitudinal direction and/or in a transverse direction, in particular with reference respectively to its longitudinal dimension or transverse dimension of the polymer layer in the unelongated state. For example, the polymer layer can be elongated, in particular stretched, up to ≤300%, for instance ≤200%, for example up to ≤200%, for example ≤100%, in a longitudinal direction and/or in a transverse direction, in particular with reference to its longitudinal dimension or transverse dimension of the polymer layer in the unelongated state. The elongation can be limited in this context in particular by the elastic elongation limit of the polymer layer that is used.

In the context of a further embodiment, particles are introduced at least into pores that are disposed on an anode side in the operating state of the separator; or in method step b) particles, in particular ion-conducting particles, are applied or introduced at least respectively onto or into that side of the polymer layer facing toward the anode with the cell in the operating state. Dendrite growth can thereby advantageously be suppressed at an early stage.

In the context of a further embodiment, particles are also introduced into pores that are disposed on a cathode side in the operating state of the separator, for example on both sides; or in method step b) particles, in particular ion-conducting particles, are applied or introduced respectively onto or into both sides of the elongated polymer layer. Asymmetrical elongation and contraction of the separator can thereby advantageously be avoided. This makes it possible in turn to wind the separator in simpler fashion, and in particular to prevent the separator from curling in the direction of the side not loaded with particles.

In the context of a further embodiment, the particles introduced into the pores are additionally connected to the polymer walls by intermaterial connection, for instance by surface melting and/or softening of the material of the polymer walls; or the method furthermore encompasses the method step d) of: heating the polymer layer, in particular to a temperature that is higher than or equal to the melting temperature and/or softening temperature of the material, for example polymer, of the polymer layer, the material, in particular polymer, of the polymer layer in particular thereby melting and/or softening. The advantageous result that can be obtained with a thermal method of this kind is that the material of the polymer walls, or the polymer layer, connects fixedly or by intermaterial connection to the incorporated particles.

The method can furthermore encompass the method step b1) of: pressing the particles into the pores of the polymer layer. Method step b1) can be carried out in particular in the elongated state of the polymer layer. For example, method step b1) can be carried out during and/or after method step b). For example, method step b1) can be carried out by way of a rolling and/or roller apparatus. The sealing effect and dendrite resistance can thereby, if applicable, be further increased, and degradation mechanisms can be even better avoided.

The separator can be, in particular, a separator for a lithium cell, for instance a lithium-ion cell and/or a lithium-sulfur cell and/or a lithium-oxygen cell (or lithium-air cell), for instance having a lithium metal anode or an intercalation anode, in particular having a lithium metal anode.

The method can be designed in particular for the manufacture of a separator for a lithium cell, for instance for a lithium-ion cell and/or a lithium-sulfur cell and/or a lithium-oxygen cell (or lithium-air cell), for instance having a lithium metal anode or an intercalation anode, in particular having a lithium metal anode, for instance having a liquid electrolyte and/or a solid electrolyte.

Manufacture using the method according to the present invention can be verified, for instance, by chemical and/or microscopic analysis.

With regard to further technical features and advantages of the separator according to the present invention and of the method according to the present invention, reference is herewith explicitly made to the explanations in connection with the cell according to the present invention and to the Figures and the description of the Figures.

The present invention further relates to an electrochemical cell that encompasses a separator according to the present invention and/or a separator manufactured using a method according to the present invention. The cell can be, for example, a lithium-ion cell and/or a lithium-sulfur cell and/or a lithium-oxygen cell (or lithium-air cell). The cell can in particular have a lithium metal anode.

With regard to further technical features and advantages of the cell according to the present invention, reference is herewith explicitly made to the explanations in connection with the example separator according to the present invention and to the example method according to the present invention, and to the Figures and the description of the Figures.

BRIEF DESCRIPTION OF THE DRAWINGS

Further advantages and advantageous embodiments of the present invention are shown in the figures and explained in the description below. Be it noted in this context that the Figures are merely descriptive in nature and are not intended to limit the present invention in any form.

DETAILED DESCRIPTION OF EXAMPLE EMBODIMENTS

Figure 1:
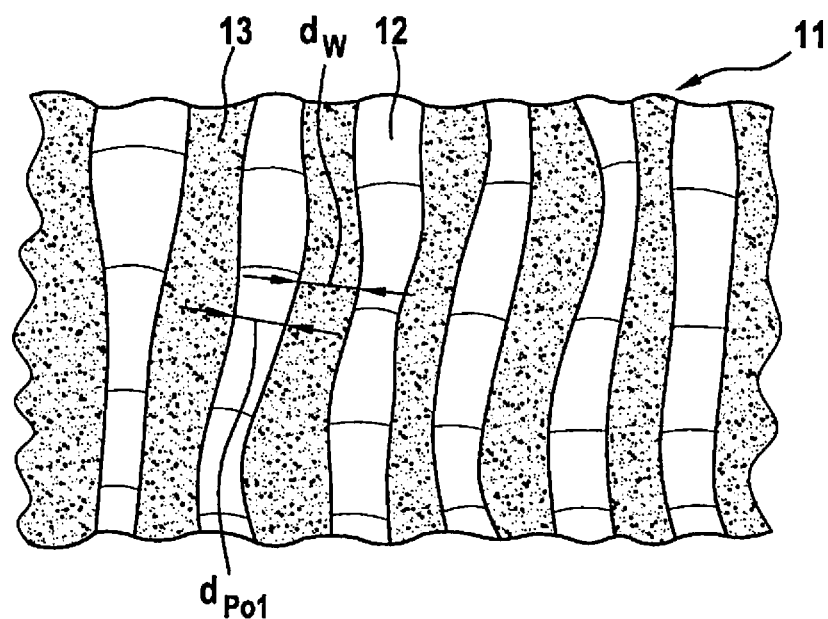
FIG. 1 is a schematic cross section through an unelongated, porous polymer layer.

FIG. 1 illustrates an elastic porous polymer layer 11, usable in the context of an embodiment of the method according to the present invention, having continuous pores 12, in the unelongated state. FIG. 1 illustrates that pores 12 are delimited by polymer walls 13 and are spaced apart from one another. FIG. 1 further illustrates that in the unelongated state of polymer layer 11, pores 12 have an average pore size ($d_{Po1}$) and polymer walls 13 have an average wall thickness ($d_w$).

Figure 2:
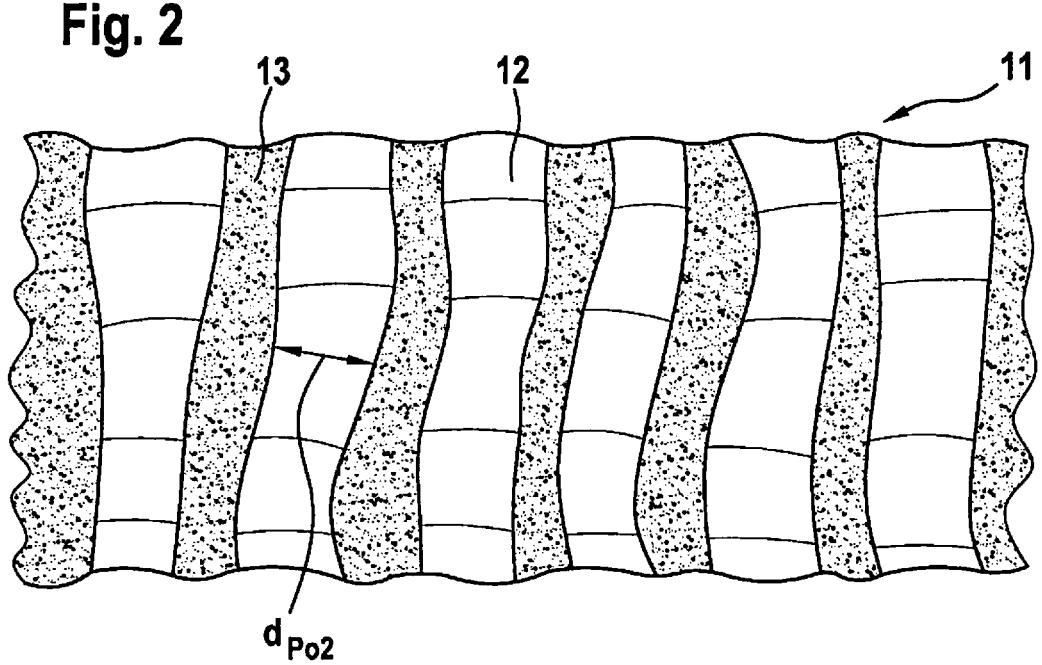
FIG. 2 is a schematic cross section through the porous polymer layer shown in FIG. 1, in the elongated state in method step a).

FIG. 2 shows polymer layer 11 shown in FIG. 1 after it has been elongated or stretched in a method step a). FIG. 1 indicates that in method step a), polymer layer 11 can be elongated, for instance in a longitudinal direction and/or in a transverse direction, for example approximately 100% with reference respectively to its longitudinal dimension or transverse direction. FIG. 2 illustrates that the average pore size ($d_{Po2}$) of pores 12 has been enlarged by the elongation of polymer layer 11.

Figure 3:
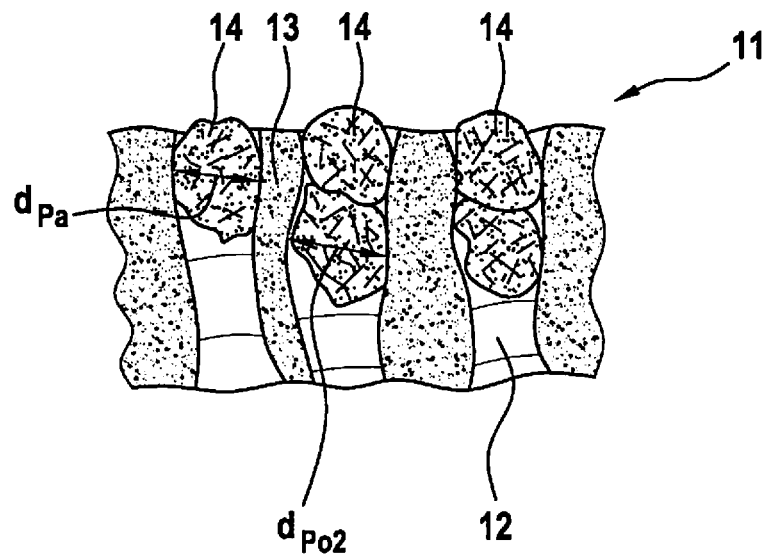
FIG. 3 is a schematic cross section through the elongated porous polymer layer shown in FIG. 2, after the introduction of ion-conducting particles in method step b).

FIG. 3 shows polymer layer 11 shown in FIG. 2, in the elongated state after ion-conducting particles 12 have been introduced in a method step b) into pores 12 thereof. Introduction of the ion-conducting particles 14 into pores 12 can be accomplished, for example, by the fact that a powder is applied onto at least one side of polymer layer 11 in the elongated state. FIG. 3 shows that particles 14 penetrate in this context into pores 12 that have been enlarged by the elongation of polymer layer 11. If applicable, particles 14 can additionally be pressed into pores 12, for example by way of a rolling and/or roller apparatus. FIG. 3 further illustrates that particles 14 have an average particle size ($d_{Pa}$), which ($d_{Pa}$) is less than or equal to the average pore size ($d_{Po2}$) of polymer layer 11 in the elongated state and in particular is greater than the average pore size ($d_{Po1}$), shown in FIG. 1, of polymer layer 11 in the unelongated state.

Figure 4:
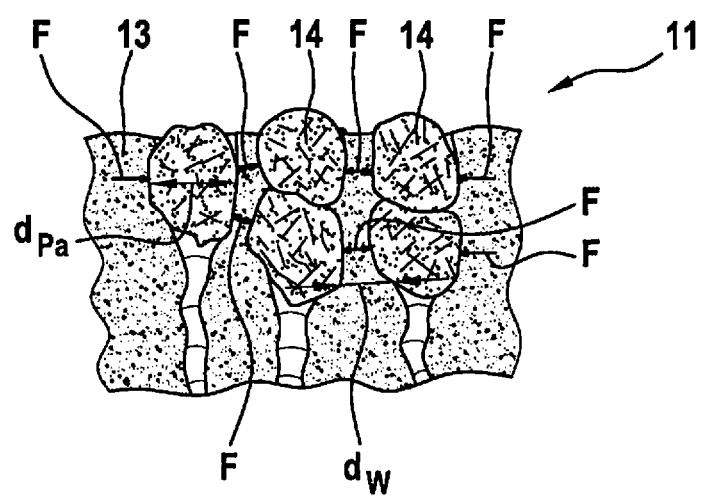
FIG. 4 is a schematic cross section through the porous polymer layer shown in FIG. 3, after relaxation in method step c).

FIG. 4 shows polymer layer 11 shown in FIG. 3 after relaxation thereof 11 in a method step c). FIG. 4 illustrates that upon relaxation of polymer layer 11, the average pore size of pores 12 shrinks again, the result of the relaxing polymer layer 11 being that a force F, for instance a compressive stress or an elongation recovery force or relaxation force of polymer layer 11, is applied onto the introduced or incorporated particles 14, by way of which force particles 14 are frictionally retained between polymer walls 13 and thereby fastened in polymer layer 11. FIG. 4 furthermore illustrates that the average wall thickness ($d_w$) of polymer walls 13 in the unelongated or relaxed state of polymer layer 11 is less than the average particle size ($d_{Pa}$) of particles 14.

What is claimed is:

1. A method for manufacturing a separator for an electrochemical cell, comprising:
    elongating into an elongated state a porous polymer layer having pores formed at least one of as continuous pores and in continuous pore networks;
    introducing particles into the pores of the polymer layer on at least one side of the polymer layer in the elongated state; and subsequent to the introduction of the particles, relaxing the polymer layer into a relaxed state.

2. The method as recited in claim 1, wherein the at least one side includes at least a side of the polymer layer that faces toward a cathode in an operating state of the cell.

3. The method as recited in claim 1, wherein the electrochemical cell is a lithium cell.

4. The method as recited in claim 1, wherein the particles are ion-conducting.

5. The method as recited in claim 1, wherein the particles are constituted from an impervious material.

6. The method as recited in claim 1, wherein the particles are constituted from a porous material.

7. The method as recited in claim 1, wherein the particles are metal ion-conducting, proton-conducting, anion-conducting, or lithium ion-conducting.

8. The method as recited in claim 1, wherein the particles are inorganic particles.

9. The method as recited in claim 1, wherein the particles are organic particles.

10. The method as recited in claim 1, wherein in the elongating step, the polymer layer is elongated in a longitudinal direction and in a transverse direction, the polymer layer being elongated ≥20%.

11. The method as recited in claim 1, wherein the at least one side includes at least a side of the polymer layer that faces toward an anode in an operating state of the cell.

12. The method as recited in claim 1, wherein the at least one side includes at least two opposite sides of the elongated polymer layer.

13. The method as recited in claim 1, further comprising:
after the relaxing step, heating the polymer layer to a temperature that is greater than or equal to at least one of: i) a melting temperature of a material of the polymer layer, and ii) a softening temperature of the material of the polymer layer.

14. The method as recited in claim 1, wherein the relaxing reduces an average pore size of the pores.

15. The method as recited in claim 1, wherein the relaxing tightens at least some of the pores around at least some of the particles.

16. The method as recited in claim 1, wherein the relaxing reduces an average pore size of the pores, thereby tightening at least some of the pores around at least some of the particles, thereby securing the at least some of the particles in the at least some of the pores.

17. A method for manufacturing a separator for an electrochemical cell, the method comprising:
elongating into an elongated state a porous polymer layer having pores formed at least one of as continuous pores and in continuous pore networks;
introducing particles into the pores of the polymer layer on at least one side of the polymer layer in the elongated state; and
relaxing the polymer layer into a relaxed state, wherein, in the relaxed state prior to the introduction of the particles into the pores, an average particle size of the particles is greater than an average pore size of the pores of the polymer layer, and, in the elongated state, the average particle size of the particles is less than or equal to the average pore size of the pores of the polymer layer.

18. A method for manufacturing a separator for an electrochemical cell, the method comprising:
elongating into an elongated state a porous polymer layer having pores formed at least one of as continuous pores and in continuous pore networks;
introducing particles into the pores of the polymer layer on at least one side of the polymer layer in the elongated state; and
relaxing the polymer layer into a relaxed state, wherein the pores of the polymer layer are delimited by polymer walls, and an average wall thickness of the polymer walls in the relaxed state of the polymer layer is less than an average particle size of the particles.

19. The method as recited in claim 18, wherein an average particle size of the particles is greater than an average pore size of the pores of the polymer layer in the relaxed state prior to the introduction of the particles into the pores.

* * * * *